Aug. 5, 1952 P. DE LOE 2,605,861
SHOCK ABSORBER
Filed June 9, 1949 2 SHEETS—SHEET 1

INVENTOR.
PAUL DE LOE
BY Robert A. Sloman
ATTORNEY.

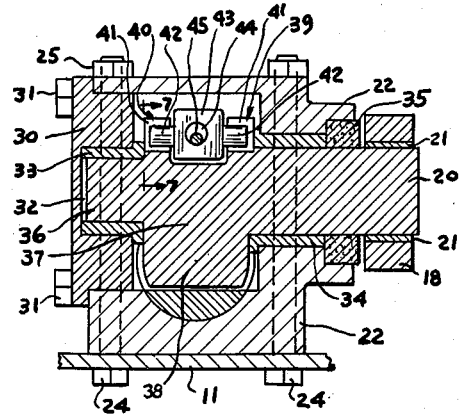

Patented Aug. 5, 1952

2,605,861

UNITED STATES PATENT OFFICE 2,605,861

SHOCK ABSORBER

Paul De Loe, Detroit, Mich.

Application June 9, 1949, Serial No. 98,058

10 Claims. (Cl. 188—88)

This invention relates to shock absorbers for vehicles and more particularly to a hydraulic shock absorber adapted to assist and control the action of vehicle springs.

It is the object of this invention to provide a self-adjusting point of equilibrium which will give the vehicle springs freedom of action where weight of load and lift of springs are equal.

It is the further object of this invention to provide for self adjustment of this point of equilibrium so that the same will coincide with the spring and load equilibrium as the load is varied by the number of passengers or other load on the vehicle.

It is the further object of this invention to provide a shock absorber construction wherein there will be no resistance to movement of the springs away from this point of equilibrium in either direction.

It is the further object of this invention to provide in said shock absorber mechanism whereby there will be resistance to movement of the springs back toward equilibrium in both directions.

It is the further object of this invention to provide that said resistance to movements back toward equilibrium will be in direct proportion to the distance from equilibrium and diminish to zero at equilibrium.

It is the further object of this invention to provide a simple and rugged shock absorber which will be compact in design and which will not be susceptible to loss of efficiency due to temperature changes.

These and other objects will be seen from the following specification and claims in conjunction with the appended drawings in which:

Figure 4 is an elevational section on line 4—4 of Fig. 3.

Figure 5 is a view similar to that shown in Fig. 3 but with the point of equilibrium illustrated as where the vehicle is loaded.

Figure 6 is an elevational section on line 6—6 of Fig. 3.

Figure 7 is a fragmentary elevational view of a portion of the shock absorber cam or actuator with the trunnion ring mounted thereon, taken on line 7—7 of Fig. 4.

It will be understood that the above drawings illustrate merely a preferred embodiment of the invention and that other embodiments are contemplated within the scope of the claims hereafter set out.

Figure 1:
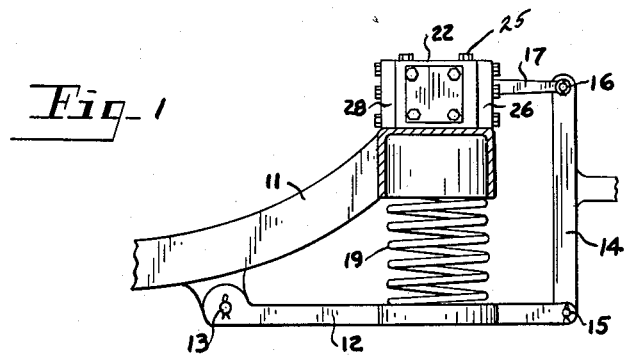
Figure 1 is a fragmentary partially sectioned elevational view illustrating the mounting of the shock absorber upon the front wheel spring suspension.

Referring to the drawings a portion of the vehicle frame 11 is shown in Figure 1 to which there is joined a front wheel spring suspension which includes lower arm 12 pivotally mounted upon the frame at one end at point 13 with its opposite end being pivotally joined to the upright wheel support 14 at point 15.

The upper control arm 17 is linked at 16 to the upper end of the support 14, while the opposite enlarged hollow end 18 of said arm is suitably secured to the shock absorber shaft 20 such as by the key 21. It is contemplated that there may be a splined connection between the upper control arm 17 and said shaft 20. A suitable coil spring 19 is positioned intermediate the frame 11 and the top portion of the lower arm 12 of the wheel suspension.

Figure 2:
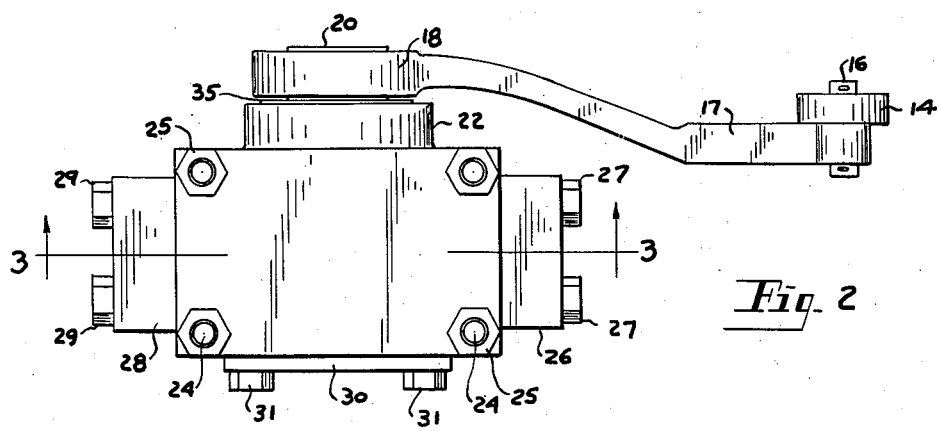
Figure 2 is a top plan view of the shock absorber.

As shown in Figures 2 and 4 shaft 20 is rotatably journalled within housing 22 which is secured to vehicle frame 11 by the bolts 24 and the corresponding nuts 25.

Referring to Figures 2, 3, 5 and 6 there are shown the end cover plates 26 and 28 or cylinder heads which are suitably joined to opposite ends of housing 22 by the bolts 27 and 29 respectively.

As shown in Figures 2, 4 and 6 there is another cover plate 30 providing a lateral closure for the housing 22 being secured therein by the bolts 31. The central recess 32 is formed upon the inner surface of the lateral cover 30 and has a bushing 33 therein to cooperatively receive and journal the outer reduced end 36 of the shock absorber shaft 20. Another bushing 34 is arranged upon the opposite side of the body 22 and is adapted to rotatably journal the outer portion of said shaft, there being a suitable seal 35 being interposed between said shaft and said body 22 where the same projects therefrom.

Shaft 20 has formed or secured thereon the actuator 37 which is rockably positioned within the interior of the shock absorber housing with its lower portion terminating in the cam 38. The upper portion of said actuator is centrally slotted to form the pair of oppositely arranged spaced trunnion supports 39 and 40 as shown in Figure 4. As shown in Figures 4 and 7 each of said trunnion supports are centrally and transversely slotted at points 41 with the lower portions of said transverse slots being spherically formed at points 41' as shown in Figure 7, to rockably support the trunnion ring hereafter to be described.

The trunnion ring has a central flat portion 43 which terminates at its opposite ends in the outwardly projecting trunnion arms 42 which are flat upon the sides 42' and arcuate upon the sides 42", with said arcuate portions being rockably nested within the correspondingly shaped slots 41' in the trunnion supports 39 and 40. The trunnion arms 42 are inserted within the slots 41 by rotating the same 90 degrees from the position shown in Figure 7. It follows further that once said arms are properly positioned as shown in Figure 7, it would be impossible for the same to slip out of the trunnion support slots unless the trunnion ring was first rotated 90 degrees, which is impossible once the shock absorber is properly assembled.

Referring to Figures 4 and 5 the trunnion ring 43 has a central hole 44 through which extends the relatively stiff wire 45, the opposite ends of which are looped at points 50 around the transverse pins 49 which extend through the spaced pistons 48 and 53 shown in Figure 5.

Said pistons are slidably positioned within corresponding recesses 46 formed within the interior portions of cylinder heads 26 and 28. Said cylinder heads also have formed therein the cylindrical chambers 47 which are adapted to slidably receive the opposite ends 62 and 63 of a double acting piston hereafter described.

Both of the pistons 48 and 53 are centrally recessed at points 51 to receive the loops 50 of the wire 45. Both of the pistons 48 and 53 are provided with channels 52 which provide fluid communication between cylindrical openings 46 and the open recesses 51 in said pistons.

Control valve 54 with central opening 55 therein is reciprocally positioned within the body 22 and at one end bears against piston 53 there being a suitable coiled spring 56 interposed between said valve and one side of the trunnion ring 43 normally maintaining said valve in engagement with the piston 53.

There is a second control valve 59 with a central opening 55 therethrough which is slidably positioned within the housing 22 adjacent the body portion 61, and this valve bears against the outer end of piston 48, there being a suitable coil spring 60 which is interposed between the trunnion ring 43 and the interior portion 58 of said control valve.

A double acting reciprocal piston 62—63 is slidably positioned within housing 22 upon the opposite side of body portions 61 with their respective ends being adapted for sliding movements into the cylindrical compression chambers 47 formed in the cylinder heads 26 and 28 as shown in Figure 5.

Said piston has a central recess 57 within its upper surface to cooperatively receive cam 38 upon the lower end of the actuator 37 upon the shaft 20 whereby it is seen that swinging movements of the upper control arm 17 of the wheel suspension are adapted to effect a rocking movement in one direction or the other of said actuator and the cam which forms a part thereof. Thus the piston is projected either to the right or to the left depending upon whether the vehicle wheel suspension is under tension or compression.

The channel 64—65 is formed within one end of the piston element 63 establishing fluid communication between compression chamber 47 and the central chamber 66 within the shock absorber housing. Furthermore, there is a corresponding channel 64—65 formed within the piston element 62 adapted to establish fluid communication between cylindrical compression chamber 47 and the central chamber 66.

Both of the channels at opposite ends of piston 62—63 have oppositely arranged valve seats 67 and are adapted to receive the one way fluid control valves 68 and 76 whose stems 69 slidably project within corresponding guide openings 70 formed within said piston. The end portions of the piston element 62—63 have an interior annular flange 71, and the coiled springs 72 are respectively interposed between said flanges and the outer ends of the one-way valves 68 and 76 normally maintaining the same against their respective seats 67 and closing off fluid communication through the said channels 64—65.

By this construction it is apparent that these passages are normally closed and will remain closed when either of the piston elements 62 or 63 are under compressive outward movement into compression chambers 47. In other words if the shaft 20 is rotated so as to project the cam 38 and the piston element 63 to the right it is apparent that the fluid within the corresponding compression chamber 47 will be under compression and the valve 76 will remain closed. At the same time it is apparent that the valve 68 will be opened against the action of the spring 72 and fluid may flow from the central chamber 66 through channel 65—64 and into the chamber 47 which corresponds to the piston element 62. It will be contemplated that this chamber 47 is not under compression so that the oil within the central chamber 66 merely has to overcome the tension in the coil spring 72.

The cylindrical chambers 47 are adapted for communication with the interior of the central chamber 66 through the passages 73, 74 and central openings through the control valves 54 and 59 respectively. It will be noted however, that said passages are normally closed by said control valves whose outer annular portions are normally maintained in engagement with the corresponding inner edges of the pistons 48 and 53.

Each of the valves 54 and 59 have an outer annular portion of reduced diameter i. e. elements 75 which are so arranged that the application of pressure fluid thereto from either of the compression chambers respectively will cause the one or the other of the control valves to open the passage 73—74—55.

It will be noted that control valve 59 is normally maintained closed with respect to the passage 73—74—55 by virtue of the coiled spring 60. And on the other hand the control valve 54 is normally maintained closed by virtue of the coiled spring 56.

Now viewing the shock absorber as a whole, it appears that for normal operation the same will be completely full of oil or other suitable fluid and this includes central chamber 66, the passages 73, 74, 55 as well as compression chambers 47 and the cylindrical openings 46 which receive the pistons 48 and 53. Furthermore, it will be noted that the central chamber 66 is provided fluid communication to the compression chambers 47 by means of the passages 73—74—55 which are controlled by the valves 54 and 59.

Furthermore central chamber 66 is also provided fluid communication to the respective compression chambers 47 through the channels 64—65 which are formed within the piston elements 62 and 63. Fluid communication is regulated through these channels by the two one-way valves 68 and 76.

In operation if the cam 38 is projected to the right, the piston element 63 is likewise projected to the right tending to compress the fluid within the compression chamber 47 inasmuch as valve 76 remains closed. The increased pressure of fluid within chamber 47 corresponding to piston element 63 is transmitted thru the passages 73 and 74 and into the annular opening 75 at the end of the valve 59 which causes the same to move to the left and permits the flow of fluid from passages 73 and 74 thru the central passage 55 of said valve and into the central chamber 66. At the same time pressure fluid within the central chamber 66 flows through the passage 65—64 causing the valve 68 to open against the compression of the coiled spring 62 and this fluid flows into the compression chamber 47 corresponding to piston element 62.

The above movement of the piston element 63 corresponds to movement of the wheel suspension away from the point of equilibrium and it will be seen that there is a very minimum of resistance to movement of this piston element due to the fact that it was only necessary for the compressed fluid in chamber 47 to operatively project against the annular element 75 of the control valve 59 moving the same to the left. It will be noted that as soon as piston 63 moves the slightest distance to the right, any compression which existed in spring 60 is removed, or alternately there may actually be a spaced relation defined between the end of the spring and valve 59, thus there is a minimum of resistance to movement of valve 59. Furthermore, the flow was only very slightly resisted by the minimum force required to overcome the compression of coil spring 72 corresponding to piston element 62.

Now on the return movement of the piston element 62—63 back to its initial position, there will be a resistance thereto which is explained by the fact that the coil spring 56 has been compressed when the cam 38 was projected to the right so that the control valve 54 more tightly engages the piston 53 closing off the passages 73 and 74 from the passage 55.

It follows further that as cam 38 projects the piston element 62 to the left in returning to the point of initial equilibrium, it places the fluid within the corresponding chamber 47 under compression and the valve 68 naturally remains closed. Now the fluid within this chamber 47 can escape only through the passages 73—74—55. To do this the increased compression of spring 56 must be overcome by the fluid from passage 74 as it acts upon the annular element 75 formed within the control valve 54. For this reason the escape of fluid under pressure from the aforementioned chamber 47 is resisted as it must fight the increased compression of the coil spring 56. Consequently it is apparent that the return to the equilibrium position is resisted in the present shock absorber whereas the initial movement away from equilibrium was substantially not resisted.

Figure 3:
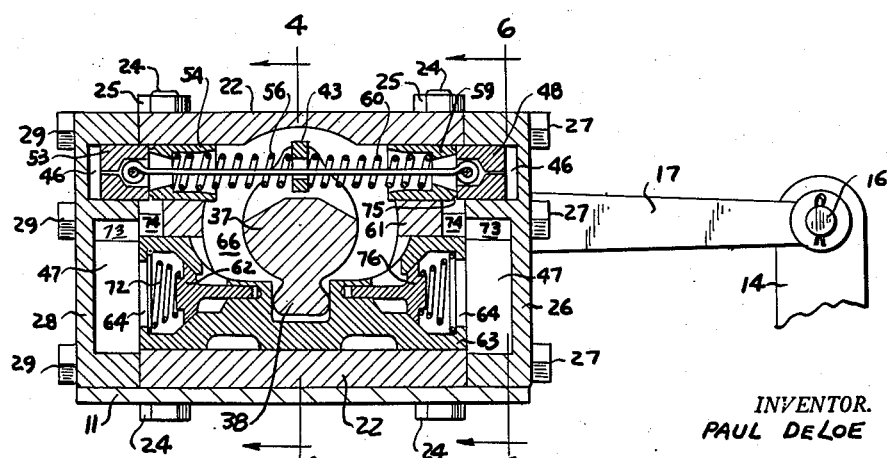
Figure 3 is an elevational section on line 3—3 of Fig. 2.

Now suppose the initial movement of the spring suspension from equilibrium was in the opposite direction. In that case the cam 38 which is shown in Figure 3 would be projected to the left causing the piston element 62 to move to the left into compression chamber 47. Fluid passes through the passages 73 and 74, readily unseats the control valve 54 in view of the released condition of coil spring 56 and flows through passage 55 and into the central chamber 66 whence it flows through the channel 65—64 corresponding to piston element 63 with a minimum of resistance existing in the valve spring 72. Here also it is seen that there is only a minimum of resistance to movement of the spring suspension away from the point of equilibrium.

However, by the above construction, it is apparent that here also the return movement of the suspension to equilibrium will be resisted by the increased compression within the coil spring 60 for it is clear that when the cam 38 was projected to the left the coil spring 60 was placed under substantial compression. The fluid within the compression chamber 47 corresponding to piston element 63 passes through passage 73 and 74 and will continue to pass through passage 55 but will be required to maintain the valve 59 open against the action of the compressed coil spring 60. It will be remembered that this fluid from chamber 47 and passages 73 and 74 is acting upon the end area within the annular control element 75 of said piston. It necessarily follows that there is a substantial resistance to the escape of fluid through the passages 73, 74 and 55.

It will be remembered also that as the piston element gradually returns towards its initial position of equilibrium that simultaneously the compression within coil spring 60 will be gradually reduced which means that the resistance to flow through the control valve 59 is gradually reduced as the suspension returns to its position of initial equilibrium.

It might be assumed that with the vehicle empty and with no passengers that the shock absorber elements will take approximately the position shown in Figure 3 which would be a point of equilibrium. However, as soon as the vehicle is loaded and there is a passenger or passengers the position of initial equilibrium is more likely to be shown by the relative position of parts shown in Figure 5, or in some position intermediate the position shown in Figure 5 and the position shown in Figure 3, due to the increased weight of the vehicle load.

It is contemplated by the present invention that this initial point of equilibrium will be self adjusting and will vary according to the load in the vehicle or the number of passengers therein. Nevertheless, the operation of the shock absorber will be substantially the same as that earlier described with the exception that the initial point of equilibrium within the shock absorber will be something like the position shown in Figure 5 of the drawings. This initial point of equilibrium will place only slight compression upon either of the coil springs 56 or 60 but this compression will not seriously effect the unseating of the corresponding control valve as when the spring suspension is moving away from the established point of equilibrium. This is due to the fact that the pistons 53 and 48 are slidable within cylindrical openings and have slots 52 formed therein to permit the passage of fluid between chamber 46 and passage 55.

For this reason the central free point of no resistance is established at which time the coil springs 56 and 60 are under only very slight or no compression. If in the initial setting of equilibrium piston 53 moves to the left, then the other piston 48 will also move to the left being joined to the first piston by the wire 45.

Consequently it is apparent that the above described shock absorber has a central free point of practically zero resistance which will give the springs freedom of action.

It will be noted that in obtaining the initial point of equilibrium the pistons 48 and 53 will move in unison within their respective cylinders 46 in view of the slots 52 therein which permits the slow flow of fluid therethrough.

As this initial setting takes place rather slowly, it is not necessary to take into consideration such initial movement. However, during operation of the shock absorber, in which the tension or compression of the coil springs 56 and 60 will be varied, the openings 52 of said pistons are of such dimensions that their positions will be relatively unchanged.

Having described my invention reference should now be had to the claims which follow for determining the scope thereof.

I claim:

1. In a hydraulic shock absorber having a housing and a rockable cam shaft therein joined to the spring suspension of a vehicle, said housing being formed with a central chamber and a pair of spaced cylindrical compression chambers and with fluid passages respectively interconnecting said central chamber with each of said compression chambers, oppositely arranged valves in said passages normally closing the same, each of said valves having a portion of reduced diameter adjacent its seat and in communication with the fluid in said passages, whereby the latter upon the application of pressure is effective to unseat said valves permitting escape of fluid therethrough into said central chamber a double acting reciprocal piston in said housing with its ends projecting into said compression chambers and operatively engaged by said cam shaft, there being channels in said piston respectively joining said central chamber with said compression chambers, one way spring loaded valves in said piston normally closing said channels and remaining closed when under compression, a spring stop projecting from said cam shaft opposite from the cam thereon, and oppositely arranged coil springs loosely interposed between opposite sides of said stop and the respective ends of said passage controlling valves, so that movement in one direction of said stop upon initial movement of said suspension away from equilibrium compresses one spring and eliminates compression from the other spring.

2. In a shock absorber having a central chamber, a pair of spaced compression chambers, a double acting piston projecting into said compression chambers, a rockable cam joined to said piston to effect reciprocal movements thereof, and bleed passages interconnecting said compression chambers with said central chamber; oppositely arranged control valves normally closing said passages, each of said valves having a portion of reduced diameter adjacent its seat and in communication with the fluid in said passages, whereby the latter upon the application of pressure is effective to unseat said valves permitting escape of fluid therethrough into said central chamber a spring stop oppositely arranged from said cam and projecting from said shaft and movable therewith, and oppositely arranged coil springs interposed between opposite sides of said stop and said control valves, so that movement in one direction of said stop upon initial movement of said suspension away from equilibrium compresses one spring and eliminates compression from the other spring.

3. In a shock absorber having a central chamber, a pair of spaced compression chambers, a double acting piston projecting into said compression chambers, a rockable cam joined to said piston to effect reciprocal movements thereof, and bleed passages interconnecting said compression chambers with said central chamber; oppositely arranged control valves normally closing said passages, each of said valves having a portion of reduced diameter adjacent its seat and in communication with the fluid in said passages, whereby the latter upon the application of pressure is effective to unseat said valves permitting escape of fluid therethrough into said central chamber a spring stop oppositely arranged from said cam and projecting from said shaft and movable therewith, and oppositely arranged coil springs interposed between opposite sides of said stop and said control valves, whereby movement of the piston from a position of equilibrium into one of said compression chambers effecting a corresponding movement in the opposite direction of said spring stop, removing the compression of the coil spring on the control valve corresponding to the chamber under compression whereby resistance to bleeding therethrough is removed.

4. In a hydraulic shock absorber having a housing and a rockable cam shaft therein joined to the spring suspension of a vehicle, said housing being formed with a central chamber and a pair of spaced cylindrical compression chambers and with fluid passages respectively interconnecting said central chamber with each of said compression chambers oppositely arranged valves in said passages normally closing the same, each of said valves having a portion of reduced diameter adjacent its seat and in communication with the fluid in said passages, whereby the latter upon the application of pressure is effective to unseat said valves permitting escape of fluid therethrough into said central chamber a double acting reciprocal piston in said housing with its ends projecting into said compression chambers and operatively engaged by said cam shaft, a spring stop projecting from said cam shaft opposite from the cam thereon, and oppositely arranged coil springs interposed between opposite sides of said stop and the respective ends of said passage controlling valves, whereby movement of the piston from a position of equilibrium into one of said compression chambers effecting a corresponding movement in the opposite direction of said spring stop, eliminates the compression of the coil spring on the valve corresponding to the chamber under compression whereby resistance to bleeding therethrough is eliminated.

5. In a hydraulic shock absorber having a housing and a rockable cam shaft therein joined to the spring suspension of a vehicle, said housing being formed with a central chamber and a pair of spaced cylindrical compression chambers and with fluid passages respectively interconnecting said central chamber with each of said compression chambers, valves in said passages normally closing the same, a double acting reciprocal piston in said housing with its ends projecting into said compression chambers and operatively engaged by said cam shaft, a projecting spring stop on said cam shaft opposite from the cam thereon, coil springs interposed between opposite sides of said stop, and the respective ends of said passage controlling valves, and yielding seats in said housing for said valves, whereby said cam and piston may assume an initial point of equilibrium other than the geometric central position with equal compression in said coil springs.

6. In a hydraulic shock absorber having a housing and a rockable cam shaft therein joined to the spring suspension of a vehicle, said housing being formed with a central chamber and a pair of spaced cylindrical compression chambers and with fluid passages respectively interconnecting said central chamber with each of said compression chambers, valves in said passages normally closing the same, a double acting reciprocal piston in said housing with its ends projecting into said compression chambers and operatively engaged by said cam shaft, a projecting spring stop on said cam shaft opposite from the cam thereon, coil springs interposed between opposite sides of said stop and the respective ends of said passage controlling valves, and yielding seats in said housing for said valves, whereby said cam and piston may assume an initial point of equilibrium other than the geometric position with equal compression in said coil springs, said seats being relatively stationary during normal operation of the shock absorber.

7. In a hydraulic shock absorber having a housing and a rockable cam shaft therein joined to the spring suspension of a vehicle, said housing being formed with a central chamber and a pair of spaced cylindrical compression chambers and with fluid passages respectively interconnecting said central chamber with each of said compression chambers, valves in said passages normally closing the same, a double acting reciprocal piston in said housing with its ends projecting into said compression chambers and operatively engaged by said cam shaft, a projecting spring stop on said cam shaft opposite from the cam thereon, and coil springs interposed between opposite sides of said stop and the respective ends of said passage controlling valves, said housing having a pair of spaced cylindrical openings adjacent said passages, and yielding valve seats slidably positioned within said openings to permit the piston, cam and spring stop to assume an initial position of equilibrium based upon the vehicle load, with equal compression in said coil springs.

8. In a hydraulic shock absorber having a housing and a rockable cam shaft therein joined to the spring suspension of a vehicle, said housing being formed with a central chamber and a pair of spaced cylindrical compression chambers and with fluid passages respectively interconnecting said central chamber with each of said compression chambers, valves in said passages normally closing the same, a double acting reciprocal piston in said housing with its ends projecting into said compression chambers and operatively engaged by said cam shaft, a projecting spring stop on said cam shaft opposite from the cam thereon, and coil springs interposed between opposite sides of said stop and the respective ends of said passage controlling valves, said spring stop having a trunnion mounting upon said cam shaft so as to remain in axial alignment with said valves regardless of the angular positioning of said cam shaft.

9. In a hydraulic shock absorber having a housing and a rockable cam shaft therein joined to the spring suspension of a vehicle, said housing being formed with a central chamber and a pair of spaced cylindrical compression chambers and with fluid passages respectively interconnecting said central chamber with each of said compression chambers, valves in said passages normally closing the same, a double acting reciprocal piston in said housing with its ends projecting into said compression chambers and operatively engaged by said cam shaft, a projecting spring stop on said cam shaft opposite from the cam thereon, coil springs interposed between opposite sides of said stop and the respective ends of said passage controlling valves, yielding seats in said housing for said valves, whereby said cam and piston may assume an initial point of equilibrium other than the geometric central position with equal compression in said coil springs, and a spacer interconnecting said seats to permit their movement in unison.

10. In a hydraulic shock absorber having a housing and a rockable cam shaft therein joined to the spring suspension of a vehicle, said housing being formed with a central chamber and a pair of spaced cylindrical compression chambers and with fluid passages respectively interconnecting said central chamber with each of said compression chambers, valves in said passages normally closing the same, a double acting reciprocal piston in said housing with its ends projecting into said compression chambers and operatively engaged by said cam shaft, a projecting spring stop on said cam shaft opposite from the cam thereon, coil springs interposed between opposite sides of said stop and the respective ends of said passage controlling valves, and yielding seats in said housing for said valves, whereby said cam and piston may assume an initial point of equilibrium other than the geometric central position with equal compression in said coil springs, each of said valves having a portion of reduced diameter adjacent its seat and in communication with the fluid in said passages, whereby said fluid upon the application of pressure is effective to unseat said valves permitting escape of fluid there-through into said central chamber.

PAUL DE LOE.

REFERENCES CITED

The following references are of record in the file of this patent:

UNITED STATES PATENTS

| Number | Name | Date |
| --- | --- | --- |
| 1,967,833 | Livermore et al. | July 24, 1934 |

FOREIGN PATENTS

| Number | Country | Date |
| --- | --- | --- |
| 785,677 | France | May 20, 1935 |
| 445,101 | England | Apr. 1, 1936 |